April 8, 1930.  C. AMBRETTE  1,753,733
FOLDING MACHINE FOR ALIMENTARY PASTES
Filed Oct. 31, 1925  4 Sheets-Sheet 1

INVENTORS.
Conrad Ambrette.
BY Gustav Drews
ATTORNEY

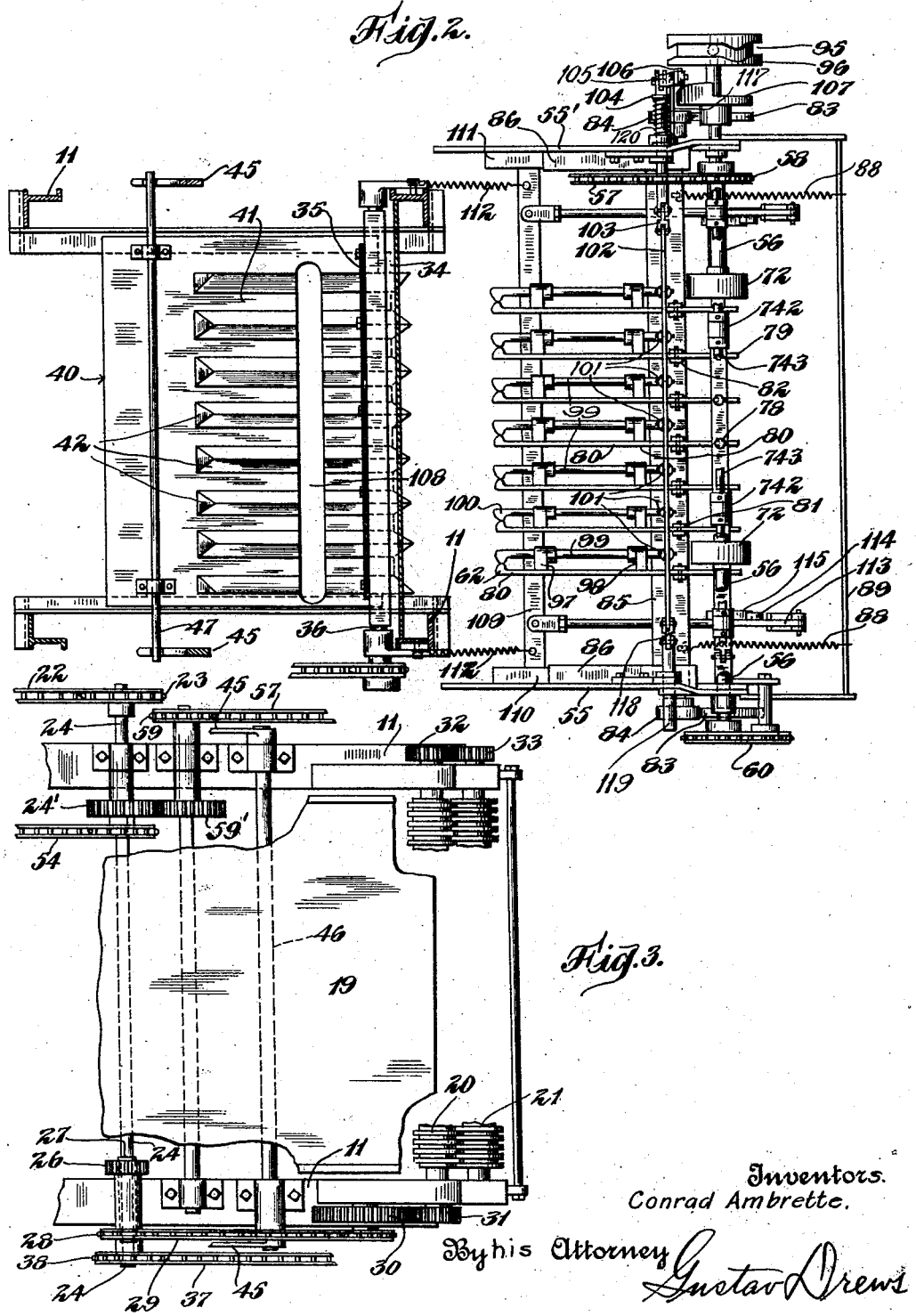

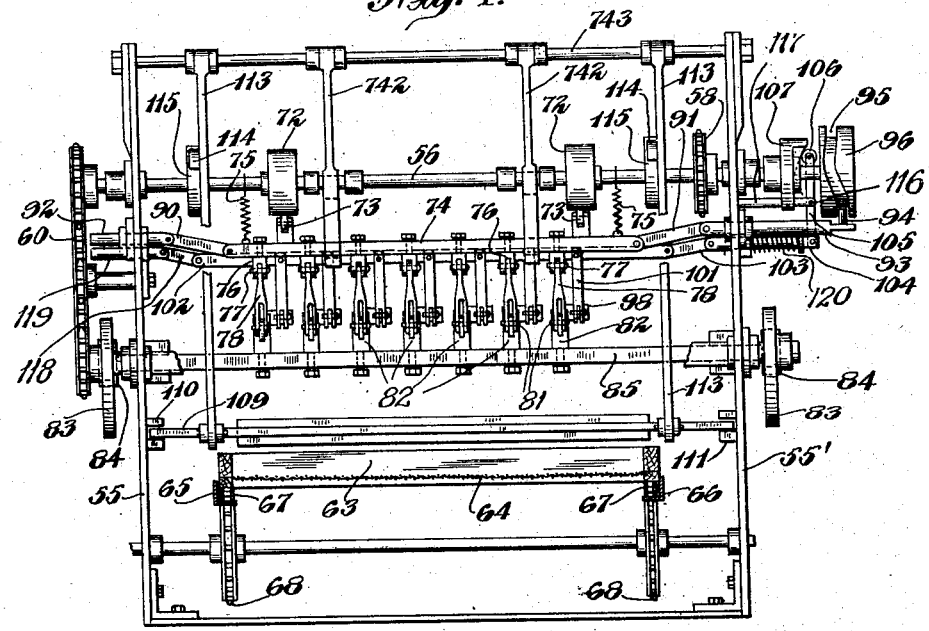

April 8, 1930.  C. AMBRETTE  1,753,733
FOLDING MACHINE FOR ALIMENTARY PASTES
Filed Oct. 31, 1925    4 Sheets-Sheet 4

Inventors
Conrad Ambrette.
By his Attorney
Gustav Drews

Patented Apr. 8, 1930

1,753,733

UNITED STATES PATENT OFFICE

CONRAD AMBRETTE, OF BROOKLYN, NEW YORK

FOLDING MACHINE FOR ALIMENTARY PASTES

Application filed October 31, 1925. Serial No. 66,012.

The present invention relates to the forming and folding of alimentary pastes such as spaghetti, noodles, vermicelli, and the like, and is more particularly directed to a method of and a machine for making spaghetti out of dough and forming it into bundles or units suitable for handling and use. As ordinarily prepared spaghetti comes from the machine in the form of long thin threads of dough which must later be dried.

The present invention contemplates an improved method of and means for handling these threads so as to assemble a number of them into bundles, having preferably a configuration substantially like a figure 8. Accordingly, a number of threads of dough (suitable to form a bundle) is picked up in the middle and allowed to hang downwardly. It is gradually lowered into a receiving tray to which the ends of the strings adhere slightly and the support for the doubled threads is given an irregular horizontal movement so that the bundle deposited on the tray has the desired configuration. While this method may be carried out by hand, it is preferable to carry it out by machine, and an object of the invention is, therefore, to provide a spaghetti forming and folding machine which may be operated by power to form the spaghetti into bundles.

Another object of the invention is to provide a folding device which acts on a plurality of bunches of strips of dough at the same time, thereby making a number of twisted bundles of spaghetti simultaneously.

Another object of the invention is to provide a spaghetti forming machine with a reciprocatory carriage provided with troughs adapted to receive and assemble the spaghetti into bunches of a size suitable for handling.

Another object of the invention is to provide a spaghetti forming and folding machine with a tray for the folded bundles of spaghetti and means for advancing the tray.

Another object of the invention is to provide a mechanically operated finger, which may be brought under a bunch of spaghetti to lift it and transfer it to a tray and at the same time move the bunch in such a manner that it is twisted into a compact bundle, preferably shaped like a figure 8. The invention contemplates that the finger be cam-operated, and in the form of a pair of cam-operated jaws, and also that a plurality of these fingers be operated simulataneously.

Other and further objects of the invention will be apparent as the description proceeds.

One of the many possible forms in which the present invention may be embodied, and the carrying out of the method, are shown for purposes of illustration, in the accompanying drawings, it being understood that these drawings are illustrative of the invention rather than limiting the same.

In these drawings:

Fig. 2 is a plan view taken along the line 2—2 of Figure 1, showing parts in section, other parts being omitted;

Fig. 3 is a fragmentary plan view, taken in the direction of the arrow 3 of Figure 1, parts being omitted;

Fig. 4 is an end elevational view taken in the direction of the arrow 4 of Figure 1, parts being omitted;

Fig. 5 is a sectional view along the broken line 5—5 of Figure 1, looking in the direction of the arrows, parts being omitted;

Figure 1:
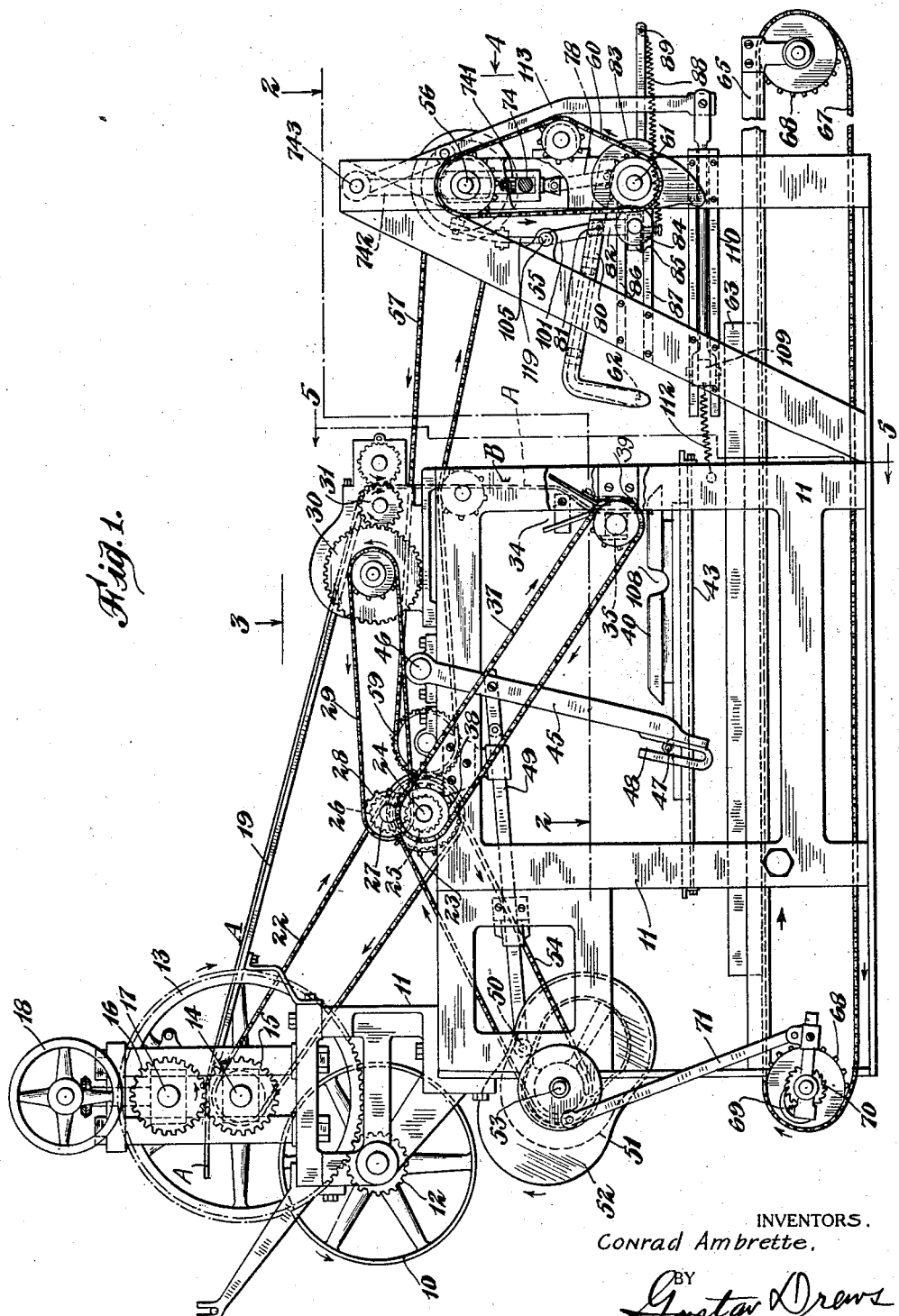
Figure 1 is a side elevational view of the forming and folding machine.
Figure 6:
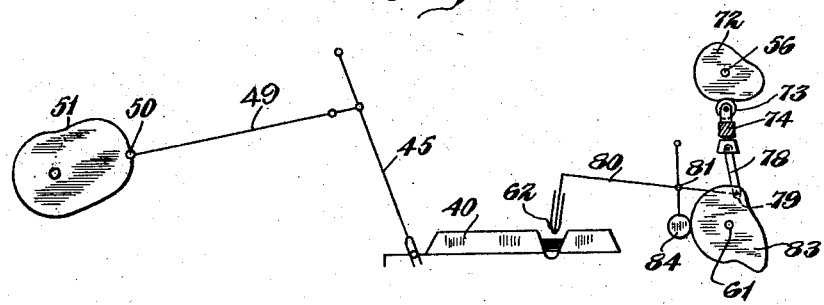
Figs. 6, 7 and 8, are diagrammatic side elevational views illustrating the arrangement of links and cams.

The machine may be driven from any suitable source of power through a pulley 10 carried in the upper rear portion of a suitable frame 11. A pinion 12, carried on the pulley shaft meshes with a gear 13 which drives a shaft 14. This shaft 14 carries a gear 15 which meshes with a gear 16 carried on a shaft 17, above the shaft 14. These two shafts carry cooperative squeeze rolls (not shown), which operate on dough to squeeze or roll it into a thin sheet A and pass it out in the direction of the arrows. The thinness of the sheet of dough is under the control of the operator by adjusting the squeeze rolls through the hand wheel 18, and usual connections to the upper squeeze roll.

The sheet of dough passes forwardly and downwardly along the top of a guide or board 19, which carries it to a pair of slitting or stripping rollers 20 and 21 (see Figs. 3 and 5). These slitting rollers act on the sheet of dough to cut it into a number of narrow threads or strips B, which are passed downwardly as indicated.

The driving connections for the slitting or stripping rollers, 20 and 21, utilize a chain 22 driven from a sprocket wheel on shaft 14. This chain drives a sprocket wheel 23 carried on shaft 24 extending across the frame; and this shaft carries a gear 25, see Fig. 1, which meshes with a gear 26 carried on a shaft 27. This shaft 27 carries a sprocket gear 28, driving a sprocket chain 29, which operates a gear 30 near the stripping rollers. This gear 30 drives the stripping or slitting roller through gears 31, 32, and 33.

As the strips or threads B hang from the rollers 20 and 21, they are directed into a chute 34 carried above a rotary cutter 35. This cutter is carried on a shaft 36 driven through a sprocket chain 37, which is operated by a sprocket wheel 38 carried on the shaft 24. In order that the hanging threads may be separated from one another so as to facilitate the forming of bunches of spaghetti, there is preferably provided a loose roller 39 placed in the trough, and provided with cones 39' as shown in Fig. 5.

Underneath the cutter 35 the machine is provided with a reciprocatory carriage 40 to receive the cut threads of spaghetti. The upper surface of this carriage is preferably provided with a number of longitudinal troughs 41, which may conveniently be made by providing raised portions or ridges 42. The carriage rides on supports 43 and 44 carried by frame 11. It is operated by a pitman 45 pivoted at 46 in the upper part of the frame and provided with a lost-motion pin-and-slot connection 47—48 with the carriage. This pitman is connected by a system of links 49, with a follower 50, placed in a cam track 51 on a cam 52. This cam member is carried on a shaft 53, and is driven by means of a sprocket chain 54, operatably connected with the shaft 24.

The freshly formed spaghetti is deposited in the troughs 41, in the form of a number of rows or bunches. The next step is to transfer this spaghetti into a receiving surface and fold or twist it into the desired form so as to change each bunch of loose threads into a bundle suitable for drying and further handling. Suitable mechanism for carrying out this operation is illustrated at the front or right hand part of Fig. 1 and in Figs. 2, 4, 6, 7, and 8.

A frame 55 is suitably supported in front of the frame 11. Near the top of this frame there is mounted a shaft 56, which is driven by means of a sprocket chain 57, cooperating with sprocket wheels 58 and 59. The latter sprocket wheel is mounted on the back side of the frame 11, and is driven from the shaft 24 through suitable gears 24' and 59'. This shaft 56 drives, through sprocket chain 60, the shaft 61, carried in the frame members 55 and 55' underneath the shaft 56. These two shafts are interconnected with and operate a number of folding fingers 62 through a number of cams and links. These fingers are actuated so as to pick up the bunches of spaghetti which rest on the carriage and deposit them on the receiving tray.

This tray is here shown in the form of a long box 63, provided with a screen 64 and carried between guides 65 and 66. It rests on sprocket chains 67, driven through sprocket wheels 68, which are actuated in an intermittent fashion through a pawl 69 and ratchet wheel 70. The pawl 69 is operated through a link 71, connected with the cam 52 at the left of the rear end of the machine.

This shaft 56 is provided with a pair of wide faced cams 72 which actuate followers 73 carried on a vertically reciprocable rod 74, springs 75 acting to keep the followers on the face of the cams. This rod is guided for vertical movement by being placed in slots 741 in vertical members 742. These members are carried from a fixed bar 743, above the shaft 56 which also passes through the slots. The rod 74 carries a number of depending links 76 which are pivoted through swivel bolts 77 to depending links 78. The lower ends of these links are connected with the front ends 79 of curved arms 80 each of which carries a finger 62 at its outer free end. These arms 80 are pivoted at 81 onto upstanding members 82, pivotally supported in a transverse bar 85.

The rotation of the cams 72 gives the free ends of the fingers 62 vertical movement. The vertical movement of each finger 62 is modified by other cam means which give it longitudinal and lateral movements. The longitudinal movement is imparted to the finger 62 by means of cams 83 carried on the shaft 61. These cams operate the followers 84 carried on the transverse bar 85, placed between guides 86 and 87 attached to the frame 55. The followers 84 are held against the face of the cams 83 by means of springs 88, coupled to a bar 89 which is carried on the front side of the machine. As the cams 83 are rotated, it is obvious that they will move the followers 84 back and forth in a horizontal direction. These followers will move the bar 85 and members 82 horizontally, and this carries the fingers 62 back and forth in a horizontal direction.

In order that the fingers 62 may have a lateral horizontal movement, a suitable arrangement is provided to rock all the fingers.

To accomplish this, the rod 74 is carried in the frame so that it can be moved lengthwise. A suitable method of carrying this rod, and to provide for moving it up and down in the slots 741 by the cam 72, is to connect it by means of links 90 and 91, with short shafts 92 and 93 mounted in the side frames. The shaft 93 is provided with a pin 94 which engages in a cam-track 95 of a cam 96 carried, as here shown, on the outer end of the shaft 56. As the shaft 56 rotates the rod 93 will be moved to the left or right, as shown in Fig. 4. This will cause the followers 73 to travel back and forth over the face of the cams 72. It will shift the rod 74 back and forth and this will cause the links 78 to also move to the right or left. This movement will cause the free ends 79 of the arms 80 to move to the right or left, and, as the members 82 are pivotally connected to the transverse bar 85, permitting the arms 80 to swing laterally, a sideways movement will be given to the fingers 62.

Each finger 62 functions as part of a pair of jaws which are caused to descend downwardly past the bunch of spaghetti threads, and to close so as to engage under the threads and carry them over to the folding table. These jaws are to open at the proper time to release the folded or twisted bundle.

Each arm 80 is provided with bearings 97 and 98, in which is pivotally mounted a shaft 99. The end 100 of the shaft near the finger 62 is bent downwardly in the same manner as the finger 62, and terminates along side of the same. The rear end of this shaft 99 is connected with a link 101, which is in turn connected with a horizontal transverse rod 102 supported for movement back and forth or across the frame. This rod 102 is connected through a link 103 with the push rod 104, slidably mounted in the frame member 55' which rod 104 is connected through a lever 105 with a follower 106 which rides along the face of a cam 107 carried on the shaft 56. The lever 105 is fulcrumed at 116 to the support 117 extending from the frame member 55' and normally maintained in extended position by the spring 120 which also maintains the roller 106 yieldably in engagement with the cam 107. The other end of the rod 102 is pivotally connected by the link 118 to the support 119 extending from the frame member 55. As the shaft 56 rotates the rod 102 will be moved back and forth and will carry the links 101 with it, thereby turning the shafts 99 in their bearings, and opening and closing the jaws which are to pick up and later release the spaghetti.

Figure 7:
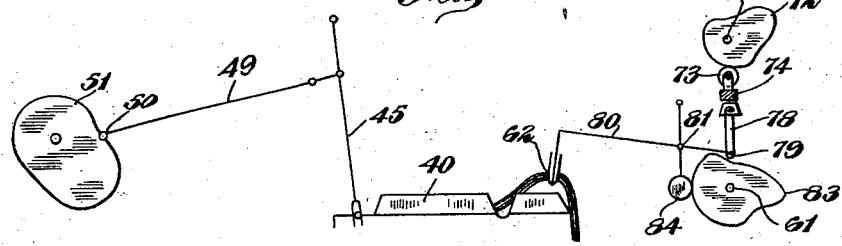
Figure 8:
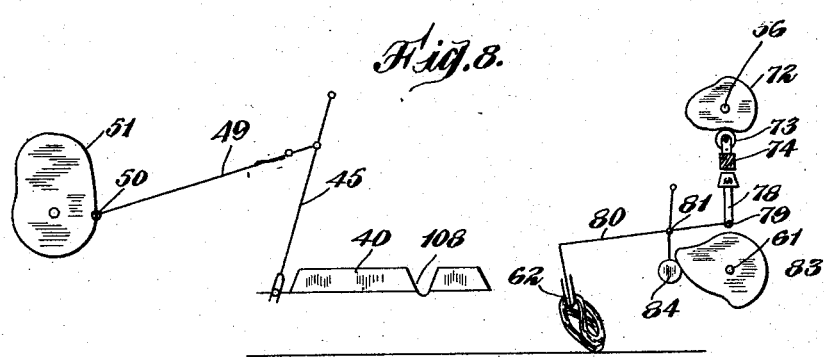
Figure 9:
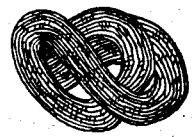
Fig. 9 is a view illustrating a folded bundle of spaghetti.

The movements, given to the jaws or fingers by the cam mechanisms which have been described, are such that all of the fingers move to the rear or left, and are lowered into a transverse trough 108 in the carrier 40. Thereupon the cam 107 operates the parts connected to it to close the jaws. The jaws pick up the bunch of spaghetti, as indicated in Fig. 7, and the carriage 40 retreats. The cams 72 and 83 and 95 operate the links and fingers so as to move the finger in the three directions and at the proper time. They first lower the doubled bunch of spaghetti so that the lower ends touch the bottom of the receiving tray 63. The ends of the spaghetti usually stick or adhere to the wire 64. When the finger is near the bottom of its movement, the cam and follower 107 and 106 open the jaws and the spaghetti is released. The receiving tray 63 is then advanced, and the operation is repeated.

While the finger is moved through a path of rather irregular curvature, it may be described, conveniently, (when viewed from above) as being in the form of a letter S during the first part of the lowering of the spaghetti. The movement is continued through another (inverted) S, so as to make a unit in which the strands are shaped substantially like a figure 8. The shape and size of these twists will depend on the configuration of the cams. They may be varied considerably and yet produce a unit convenient for drying and packing.

In order to assist in straightening out the spaghetti, as it hangs from the fingers 62, there is provided a reciprocatory bar 109 which is carried in guides 110 and 111. This bar is pulled to the left by springs 112 and is moved to the right by means of curved links 113 which carry followers 114, cooperating with the cams 115, carried on the shaft 56. These curved links are carried on the fixed bar 743 near the top of the frame.

While the specification and claims refer more specifically to the forming and folding of spaghetti, it is, of course, to be understood that the present machine and method are equally well adapted to operate on other forms of alimentary pastes, and on plastic materials in general; and it is intended that the term "spaghetti" used herein should be descriptive of such materials.

It is obvious that the invention may be embodied in various forms and constructions, and that the method may be carried on in various manners. It is to be understood, however, that the particular form shown and the method described in detail are but one of the many forms and methods. Various modifications and changes being possible, I do not limit myself in any way with respect thereto.

What is claimed, is:

1. In a machine for forming and folding spaghetti, dough feeding means, dough slitting means to form the dough into threads, means to cut the threads into strips of predetermined length, a carriage placed underneath the cutting means and provided with a longitudinal trough to receive a number of strips and assemble them into a bunch, and means to reciprocate the carriage.

2. In a machine for forming and folding spaghetti, dough feeding means, dough slitting means to form the dough into threads, means to cut the threads into strips of predetermined length, a carriage placed underneath the cutting means and provided with a longitudinal trough to receive a number of strips and assemble them into a bunch, and means to reciprocate the carriage, said means causing said carriage to project beyond the cutting means when the bunch has been deposited in the trough.

3. In a machine for forming and folding spaghetti, dough feeding means, dough slitting means to form the dough into threads, means to cut the threads into strips of predetermined length, a carriage placed underneath the cutting means and provided with a plurality of longitudinal troughs to receive a number of strips and assemble them into bunches, and means to reciprocate the carriage, said means causing said carriage to project beyond the cutting means when the bunches have been deposited in the troughs.

4. In a machine for forming and folding spaghetti, dough feeding means, dough slitting means to form the dough into threads, means to cut the threads into strips of predetermined length, a carriage placed underneath the cutting means and provided with a plurality of longitudinal troughs to receive a number of strips and assemble them into bunches, and means to reciprocate the carriage, said means causing said carriage to project beyond the cutting means when the bunches have been deposited in the troughs, there being a lateral groove in said carriage extending across and deeper than said troughs to facilitate picking the bunches out of said troughs.

5. In a machine for forming and folding spaghetti, dough feeding means, dough slitting means to form the dough into threads, means to cut the threads into strips of predetermined length, a carriage placed underneath the cutting means and provided with a longitudinal trough to receive a number of strips and assemble them into a bunch, means to reciprocate the carriage, a finger, and operating means therefor to cause the finger to pick the bunch out of the trough before the carriage retreats.

6. In a machine for forming and folding spaghetti, dough feeding means, dough slitting means to form the dough into threads, means to cut the threads into strips of predetermined length, a carriage placed underneath the cutting means and provided with a longitudinal trough to receive a number of strips and assemble them into a bunch, means to reciprocate the carriage, a narrow finger, and operating means therefor to cause the finger to pick the bunch out of the trough before the carriage retreats, the bunch doubling on itself and hanging from the finger as the finger is raised.

7. In a machine for forming and folding spaghetti, dough feeding means, dough slitting means to form the dough into threads, means to cut the threads into strips of predetermined length, a carriage placed underneath the cutting means and provided with a longitudinal trough to receive a number of strips and assemble them into a bunch, means to reciprocate the carriage, a finger, operating means therefor to cause the finger to pick the bunch out of the trough before the carriage retreats and double the bunch upon itself, and a receiver for the doubled bunch, said finger operating means causing the finger to release the bunch and deposit it on the receiver.

8. In a machine for forming and folding spaghetti, dough feeding means, dough slitting means to form the dough into threads, means to cut the threads into strips of predetermined length, a cariage placed underneath the cutting means and provided with a longitudinal trough to receive a number of strips and assemble them into a bunch, means to reciprocate the carriage, a finger operating means therefor to cause the finger to pick the bunch out of the trough before the carriage retreats and double the bunch upon itself, a receiver for the doubled bunch, said finger operating means causing the finger to release the bunch and deposit it on the receiver, and means intermittently to advance the receiver.

9. In a machine for forming and folding spaghetti, dough feeding means, dough slitting means to form the dough into threads, means to cut the threads into strips of predetermined length, a carriage placed underneath the cutting means and provided with a longitudinal trough to receive a number of strips and assemble them into a bunch, means to reciprocate the carriage, said means causing said carriage to project beyond the cutting means when the bunch has been deposited in the trough, a finger, operating means therefor to cause the finger to pick the bunch out of the trough before the carriage retreats, the bunch doubling upon itself near the middle, and a receiver for the doubled bunch, said finger operating means causing the finger to move laterally and longitudinally as it is being lowered whereby the bunch is twisted on itself, said finger operating means then releasing the bunch.

10. In a machine for forming and folding spaghetti, dough feeding means, dough slitting means to form the dough into threads, means to cut the threads into strips of predetermined length, a carriage placed underneath the cutting means and provided with a longitudinal trough to receive a number of strips and assemble them into a bunch, means to reciprocate the carriage, said means causing said carriage to project beyond the cutting means when the bunch has been deposited in the trough, a pair of jaws, means to place the jaws under the middle of the bunch, means to close the jaws to cause them to grip the bunch, means to raise the jaws as the carriage retreats, a receiver, and means gradually to lower the bunch into the receiver, the jaws being moved laterally and longitudinally and then opened to release the bunch.

11. In a machine for forming and folding spaghetti, dough feeding means, dough slitting means to form the dough into threads, means to cut the threads into strips of predetermined length, a carriage placed underneath the cutting means and provided with a longitudinal trough to receive a number of strips and assemble them into a bunch, means to reciprocate the carriage, said means causing said carriage to project beyond the cutting means when the bunch has been deposited in the trough, a continuously rotating shaft, a bunch lifting finger, a receiver, and means operated from said shaft for causing said finger to engage under the bunch, remove it from the trough and later deposit it onto the receiver in the form of a figure 8.

12. In a machine for forming and folding spaghetti, dough feeding means, dough slitting means to form the dough into threads, means to cut the threads into strips of predetermined length, a carriage placed underneath the cutting means and provided with a longitudinal trough to receive a number of strips and assemble them into a bunch, means to reciprocate the carriage, said means causing said carriage to project beyond the cutting means when the bunch has been deposited in the trough, a continuously rotating shaft, a bunch lifting finger, a receiver, and means operated from said shaft for causing said finger to engage under the bunch, remove it from the trough and later deposit it onto the receiver in the form of a figure 8, said finger being in the form of a pair of cam-operated jaws.

13. In a machine for forming and folding spaghetti, dough feeding means, dough slitting means to form the dough into threads, means to cut the threads into strips of predetermined length, a carriage placed underneath the cutting means and provided with a longitudinal trough to receive a number of strips and assemble them into a bunch, means to reciprocate the carriage, said means causing said carriage to project beyond the cutting means when the bunch has been deposited in the trough, a continuously rotating shaft, a bunch lifting finger, a receiver, and means operated from said shaft for causing said finger to engage under the bunch, remove it from the trough and later deposit it onto the receiver in the form of a figure 8, said means including a plurality of cams arranged to move the finger up and down and back and forth, both longitudinally and laterally.

14. In a machine for forming and folding spaghetti, dough feeding means, dough slitting means to form the dough into threads, means to cut the threads into strips of predetermined length, a carriage placed underneath the cutting means and provided with a longitudinal trough to receive a number of strips and assemble them into a bunch, means to reciprocate the carriage, said means causing said carriage to project beyond the cutting means when the bunch has been deposited in the trough, a continuously rotating shaft, a bunch lifting finger, a receiver, means operated from said shaft for causing said finger to engage under the bunch, remove it from the trough and later deposit it on to the receiver in the form of a figure 8, said means including a cam for moving the finger longitudinally, another cam for moving the finger vertically, and another cam for moving the finger laterally, said finger being in the form of a pair of jaws, and means operated from the shaft for opening and closing the jaws.

15. In a spaghetti folding machine, a trough adapted to hold a bunch of spaghetti, a receiving table, and means for seizing the bunch of spaghetti and depositing it on the table twisted substantially into the form of a figure 8.

16. In a spaghetti folding machine, a trough adapted to hold a bunch of spaghetti, a receiving table, a pair of jaws, means for closing the jaws onto the bunch of spaghetti, means for transferring the bunch of spaghetti from the trough to the table and for twisting it into substantially the form of a figure 8.

17. In a spaghetti folding machine, means for assembling a plurality of strips of spaghetti into a bunch, a finger, means to bring the finger underneath the bunch, means to raise the finger and lift the bunch causing it to double on itself, a receiving table engaging with the ends of the bunch as they hang from the finger as it is being lowered, and means to move the finger horizontally in two directions as it is being lowered so that the bunch is twisted into substantially the form of a figure 8.

18. In a spaghetti folding machine, means for assembling a plurality of strips of spaghetti into a bunch, a finger, means to bring the finger underneath the bunch, means to raise the finger and lift the bunch causing it to double on itself, a receiving table engaging with the ends of the bunch as they hang from the finger and are being lowered, and a plurality of cams to move the finger horizontally in two directions as it is being lowered so that the bunch is twisted into substantially the form of a figure 8.

19. In a spaghetti folding machine, means for assembling a plurality of strips of spaghetti into a bunch, a finger, cam-operated means to bring the finger underneath the bunch and to raise the finger and lift the bunch causing it to double on itself, a receiving table engaging with the ends of the bunch as they hang from the finger and are being lowered, and means to move the finger horizontally in two directions as it is being lowered so that the bunch is twisted into substantially the form of a figure 8.

20. In a spaghetti folding machine, means for assembling a plurality of strips of spaghetti into a bunch, a finger, cam-operated means to bring the finger underneath the bunch and to raise the finger and lift the bunch causing it to double on itself, a receiving table engaging with the ends of the bunch as they hang from the finger and are being lowered, and a plurality of cams to move the finger horizontally in two directions as it is being lowered so that the bunch is twisted into substantially the form of a figure 8.

21. In a spaghetti folding machine, means for assembling a plurality of strips of spaghetti into a bunch, a finger, means to bring the finger underneath the bunch, means to raise the finger and lift the bunch causing it to double on itself, a receiving table engaging with the ends of the bunch as they hang from the finger and are being lowered, means to move the finger horizontally in two directions as it is being lowered so that the bunch is twisted into substantially the form of a figure 8, said finger being in the form of a pair of jaws, and cam-operated means to open and close the jaws.

22. In combination, a spaghetti forming machine, a reciprocatory carriage onto which the spaghetti is deposited in bunches, an intermittently advanced receiving table, and a folding finger having oscillatory movements vertically and in two horizontal planes at right angles to one another, said finger movement being controlled to take a bunch of spaghetti off the carriage and deposit it on the table folded into substantially the form of a figure 8.

23. In combination, a spaghetti forming machine, a reciprocatory carrier onto which the spaghetti is simultaneously deposited in a plurality of bunches, an intermittently advanced receiving table, and a plurality of folding fingers having oscillatory movements vertically and in two horizontal planes at right angles to one another, said finger movement being controlled to take the bunches of spaghetti off the carrier and deposit them on the table folded into substantially the form of a figure 8.

24. A machine for forming and folding spaghetti, comprising dough feeding means, slitting means to form the dough into threads, cutting means to cut the threads into strips of predetermined lengths, a trough to receive the strips and assemble them into a bunch, means to reciprocate the trough, a pair of fingers, a folding surface, and means to move the fingers to cause them to grasp the bunch and lift the same out of the trough and deposit the same on said folding surface, twisted in the form of a figure 8.

25. A spaghetti folding machine having means to lift a bunch of spaghetti in the form of dough, doubling it into an inverted U, a receiver for engaging the lower ends of the bunch of spaghetti as it hangs from the lifting means and is being lowered, and means for actuating the lifting means to lower the bunch into the receiver and twist it on itself into a unit having the form of a figure 8.

26. A spaghetti folding machine having means to lift a bunch of spaghetti off a support on which it is lying lengthwise, said means permitting the spaghetti to double on itself so that the ends hang downwardly, means to move the lifting means vertically back and forth, means to give the lifting means a horizontal S-shaped movement as it is being lowered, and a receiver onto which the spaghetti is deposited, twisted into an S shape.

27. A spaghetti folding machine having means to lift a bunch of spaghetti off a support on which it is lying lengthwise, said means permitting the spaghetti to double on itself so that the ends hang downwardly, means to move the lifting means vertically back and forth, means to give the lifting means a horizontal S shaped movement as it is being lowered and to continue said movement through another S shaped path, and a receiver onto which the spaghetti is deposited in the form of a unit shaped like a figure 8.

28. In a machine for forming and folding spaghetti, a pair of squeeze rolls through which dough is rolled into the form of a sheet, a guide board, a pair of slitting rollers through which the sheet of dough passes to be cut into threads, a cutter receiving the threads of dough and cutting it into strips of predetermined length, a carriage underneath the cutter, means to reciprocate the carriage so that the strips are deposited on top of the carriage, an intermittently advanced receiving tray under the carriage, a pair of folding jaws, cam means for opening and closing the jaws, a plurality of cams operably connected with the jaws, certain of said cam means moving the jaws up and down vertically, other of said cam means moving the jaws laterally, and other of said cam means moving the jaws longitudinally, whereby the spaghetti is lifted off the carriage and deposited onto the receiving tray twisted into a bundle having the configuration of a figure 8.

29. In a machine for forming and folding spaghetti, dough feeding means, dough slitting means to form the dough into threads, means for engaging the threads as they are cut and arranging them in bundles, a carriage placed underneath said engaging means initially to receive the lower ends of the bundles, and means for advancing said carriage after receiving the lower ends of the bundles to permit the bundles to fall lengthwise of said carriage.

30. In a machine for forming and folding spaghetti, dough feeding means, dough slitting means to form the dough into threads, means for engaging the threads as they are cut and arranging them in bundles, a carriage having a plurality of longitudinal troughs corresponding in number to the bundle forming engaging means and placed underneath said engaging means initially to receive the ends of the bundles in their corresponding troughs, and means for advancing said carriage after receiving the ends of the bundles to permit the bundles to fall lengthwise of said carriage.

31. The method of forming and folding spaghetti which comprises slitting a sheet of dough to form threads, depositing a number of the threads in a trough, grasping the central part of the threads as they lay in the trough to thereby double the threads and raise the same out of the trough, lowering the doubled threads to bring the ends against a support, moving the folded part of the threads laterally in two directions to cause the threads to form a figure 8.

32. In the folding of spaghetti, the method which comprises assembling a number of threads parallel with one another in the form of a bunch, seizing the bunch centrally raising it off its support so that it hangs in the form of an inverted U, lowering it until the ends of the doubled bunch touch a stationary support, and moving the center of this bunch back and forth in two horizontal directions as it is being lowered.

CONRAD AMBRETTE.